(12) United States Patent
Conte et al.

(10) Patent No.: US 9,208,093 B2
(45) Date of Patent: Dec. 8, 2015

(54) ALLOCATION OF MEMORY SPACE TO INDIVIDUAL PROCESSOR CORES

(75) Inventors: Thomas Martin Conte, Atlanta, GA (US); Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 888 days.

(21) Appl. No.: 12/427,598

(22) Filed: Apr. 21, 2009

(65) Prior Publication Data

US 2010/0268891 A1    Oct. 21, 2010

(51) Int. Cl.
G06F 13/00 (2006.01)
G06F 13/28 (2006.01)
G06F 12/08 (2006.01)
G06F 9/38 (2006.01)
G06F 9/50 (2006.01)

(52) U.S. Cl.
CPC ............ G06F 12/084 (2013.01); G06F 9/3804 (2013.01); G06F 9/5016 (2013.01)

(58) Field of Classification Search
None
See application file for complete search history.

(56) References Cited

U.S. PATENT DOCUMENTS

| 5,689,653 | A | * | 11/1997 | Karp et al. | 712/222 |
| 5,860,151 | A | | 1/1999 | Austin et al. | |
| 2004/0260883 | A1 | * | 12/2004 | Wallin et al. | 711/137 |
| 2008/0040554 | A1 | * | 2/2008 | Zhao et al. | 711/133 |
| 2008/0209133 | A1 | | 8/2008 | Ozer et al. | |
| 2009/0106495 | A1 | | 4/2009 | Chou | |
| 2011/0047333 | A1 | | 2/2011 | Wolfe et al. | |

* cited by examiner

*Primary Examiner* — Eric S Cardwell
(74) *Attorney, Agent, or Firm* — Dorsey & Whitney LLP

(57) ABSTRACT

Techniques are generally described for a multi-core processor with a plurality of processor cores. At least one cache is accessible to at least two of the plurality of processor cores. The multi-core processor can be configured for separately allocating a memory space within the cache to the individual processor cores accessing the cache.

20 Claims, 6 Drawing Sheets

ALLOCATION OF MEMORY SPACE TO INDIVIDUAL PROCESSOR CORES

BACKGROUND

Multi-core processors have emerged as a mainstream computing platform in major market segments, including personal computer (PC), server, and embedded domains. As the number of processor cores on a given chip increase, so too does the potential demand on that chip's local memory. When the processor executes an instruction, for example, the processor first looks at its on-chip cache to find the data associated with that instruction to avoid performing a more time-consuming search for the data elsewhere (e.g., off-chip or on a main memory chip). Commercial multi-core processors often use cache designs from uni-processors. Thus, multi-core processors may share a single cache. With multiple cores, multiple incoming application streams may interfere with each other while seeking shared cache space, and as a result, may cause a shared cache, and, thus, the processor to operate inefficiently. Other factors relating to multiple cores may also reduce efficiency.

Not all applications, however, benefit from the availability of cache resources. One example is a streaming application, where data is fetched into the cache, processed, and then is unlikely to be reused. Thus, different types of applications sharing cache space with equal priority may result in sub-optimal allocation of cache resources. Conflict among processor cores for the use of a shared cache may be expensive in terms of both latency and power as a result of additional requests to off-chip memory.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
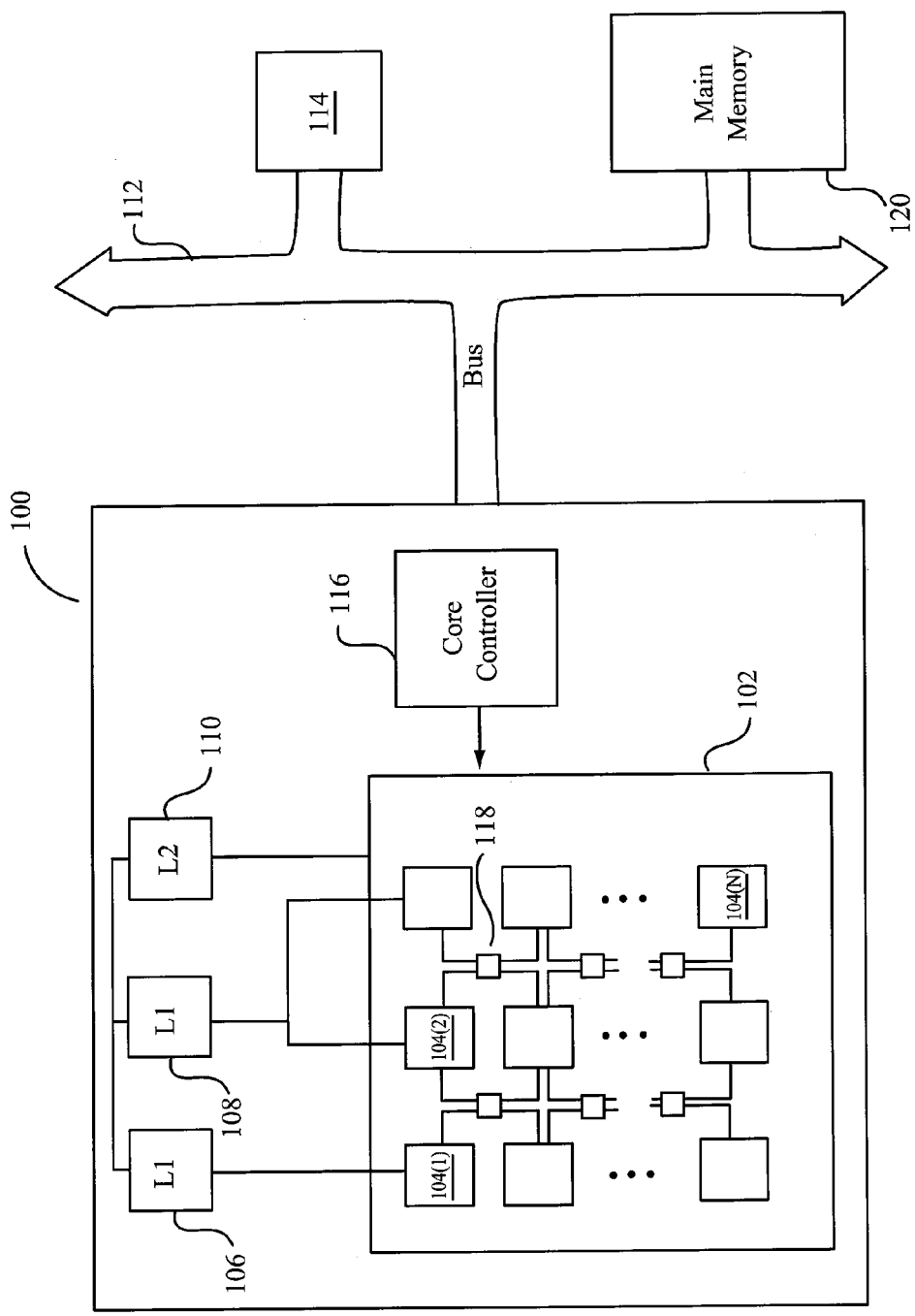
FIG. 1 is a schematic diagram illustrating a multi-core processor.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

This disclosure is drawn, inter alia, to methods, apparatus, systems and computer program products related to separately allocating a memory space within a cache to individual processor cores accessing the cache. In a multi-core processor system, several applications may be running in parallel on separate processor cores, each processor core with its own memory requirements. Memory space, however, is finite. Depending on the design of the chip, individual processor cores may have to share local memory space with one or more other processor cores. This local memory may include, for example, the L2 or L3 caches.

The execution characteristics of some running applications may differ from the execution characteristics of other running applications. These execution characteristics may also change over time. One such execution characteristic may be the amount of local memory needed to achieve adequate processing performance. For example, one application may operate more efficiently when a large amount of cache space is available, while another application may operate efficiently with any amount of cache space available. Thus, on a chip with limited cache space, the benefit to each application of obtaining additional cache resources may vary.

As is described herein, various examples for efficient use of shared cache resources in a multi-core computing environment are disclosed. By recognizing which processor cores may benefit from additional cache space, shared caches may be partitioned. For example, distinct areas of the cache may be allocated for the exclusive use of one or more of the cores. Furthermore, as application execution characteristics change over time, cache allocation may change dynamically. Thus, by reducing the interference resulting from competition for cache space among the cores, overall system performance may be improved.

FIG. 1 is a schematic diagram illustrating a multi-core processor 100 arranged in accordance with at least some examples of the present disclosure. Multi-core processor 100 may include a single integrated circuit having a processing core array 102. In other examples a multi-core processor may include processors on separate integrated chips. The processing core array 102 may include some number (N) of processing cores 104(1)-104(N). Any suitable number of processing cores 104 may be provided. Each processing core 104 may generally be of any desired configuration including but not limited to a microprocessor (µP), a microcontroller (µC), a digital signal processor (DSP), or any combination thereof. Thus, each processing core 104 may include logic for executing program instructions as well as other functional blocks such as an arithmetic logic unit (ALU), a floating point unit (FPU), a digital signal processing (DSP) core, registers, accumulators, etc.

The multi-core processor 100 may include any combination of dedicated or shared resources. A dedicated resource may be a resource 106 dedicated to a single processing core 104, such as a dedicated level one cache, or may be a resource 108 dedicated to any subset of the processing cores 104. A shared resource may be a resource 110 shared by some or all of the cores 104, such as a shared level two cache or a shared external bus 112. Such a shared external bus 112 may support an interface between the multi-core processor 100 and another component 114. Such components 114 may include, but are not limited to, input-output (I/O) devices, external sensors, or the like, or may be a resource shared by any subset of the processing cores 104. A shared resource may also include main memory 120, which may be any suitable form of memory including, but not limited to, volatile memory such as random access memory (RAM), non-volatile memory such as read only memory (ROM) and flash memory storage, data storage devices such as magnetic disk storage (e.g., hard disk drive or HDD), tape storage, optical storage (e.g., compact disk or CD, digital versatile disk or DVD), or other machine-readable storage mediums that may be removable, non-removable, volatile or non-volatile.

As stated above, multi-core processor 100 may have any suitable number of processing cores 104. For example, multi-core processor 100 may have two (2) cores, four (4) cores, tens of cores, and even hundreds or more of processing cores. Some multi-core processors may be homogenous, such that each of the processing cores uses a single core design. Other multi-core processors may be heterogeneous, such that one or more of the processing cores may be different from one or more of other processing cores, and each core or subset of cores may be designed for a different role in the multi-core processor 100.

The multi-core processor 100 may include a core controller, or core interface 116. Core controller 116 may determine which processing tasks are to be processed by individual processing cores 104. One or more switches 118 may be provided. In one example, processing tasks may be routed to selected processing cores using switches 118.

FIG. 1 is an illustrative schematic of a multi-core processor and does not illustrate physical location of the components illustrated therein. It is appreciated that the multi-core processor 100 described herein is illustrative and that examples and modifications are possible. Design choices may be driven by, for example, considerations of hardware size and complexity versus performance, thermal energy and heat dissipation, processor speed, overall throughput, etc.

As may be appreciated by one skilled in the art, the multi-core processor 100 may be provided in a suitable computing environment, such as a personal computer (PC). A computing environment may include the multi-core processor 100, system memory, one or more buses, and one or more I/O devices, such as a keyboard, mouse, touch screen, display device, such as a CRT or LCD based monitor, universal serial bus (USB) or other port connections, CD drives, DVD drives, and the like. Bus connections among the various components may be implemented using bus protocols such as Peripheral Component Interconnect (PCI), PCI Express, Accelerated Graphics Port (AGP), HyperTransport, or any other suitable bus protocol, and connections between different devices may use different protocols. A PC may operate in a networked environment using logical connections to one or more remote computers. Such remote computers may be, for example, other PCs, servers, routers, network PCs, peer devices, or other common network nodes, and may include many or all of the elements described above relative to multi-core processor 100. Logical connections may comprise, for example, a local-area network (LAN) or a wide-area network (WAN), intranets and the Internet.

Figure 2:
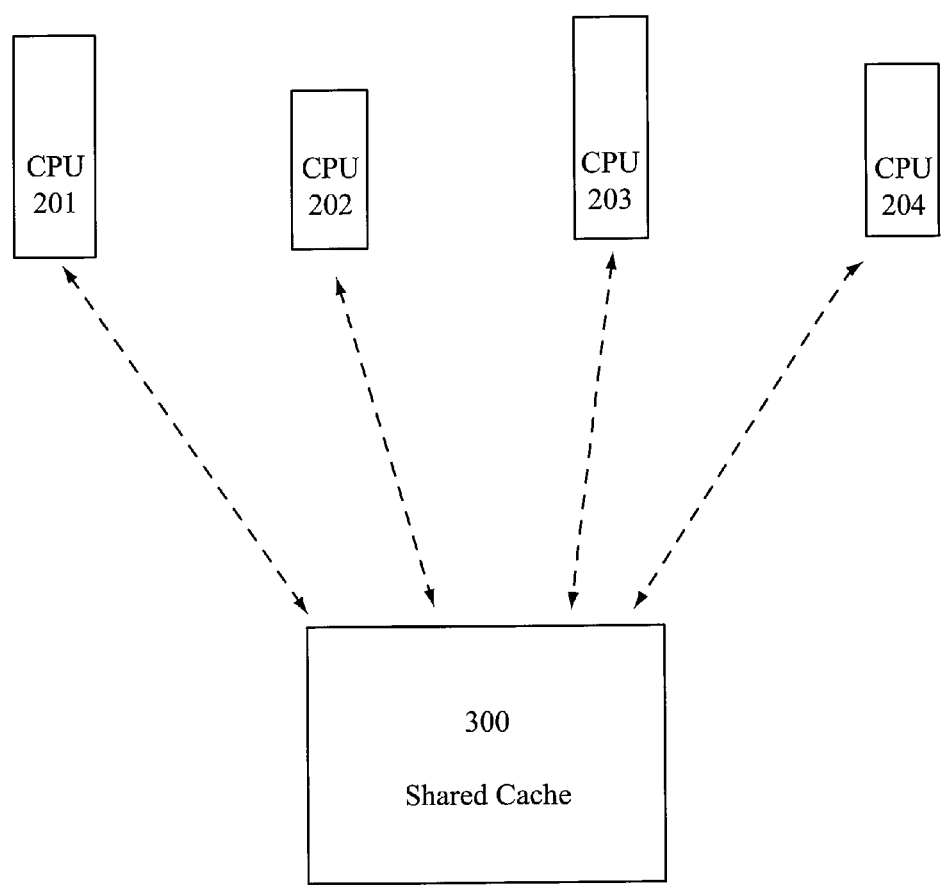
FIG. 2 is a schematic diagram illustrating a shared cache.

FIG. 2 is a schematic diagram illustrating a shared cache arranged in accordance with at least some examples of the present disclosure. In some examples, FIG. 2 illustrates a plurality of processor cores 201-204, suitable for use in a multi-core processor system. Each of processor cores 201-204 may have differing performance characteristics, as represented by the varying sizes of cores 201-204. For example, the larger cores 201 and 203 may be of higher performance, suitable for more complex software applications, as compared to the smaller cores 202 and 204, which may be suitable for processing software applications of less complexity. It is to be appreciated that more or fewer cores may be provided, that the cores may be of uniform or varying size, and that specific descriptions of the cores herein are not intended to be limiting.

A suitable shared cache 300 is depicted in FIG. 2 for use with the plurality of processor cores 201-204. Each of cores 201-204 may transfer data to and from shared cache 300. Shared cache 300 may be partitioned such that individual of cores 201-204 may only have access to certain areas within the cache. In some examples, the partitioning of shared cache 300 may be controlled by core controller 116. For example, larger cores 201 and 203 may be allocated a larger portion of cache 300 than smaller cores 202 and 204. It is to be appreciated that processor cores 201-204 may control the partitioning of cache 300 by any suitable means and based at least in part on any of the hardware attributes that the cores 201-204 may possess.

In other examples, partitioning of shared cache 300 may be done based at least in part on application threads of execution (hereinafter referred to as "threads") that are running on processor cores 201-204. For example, one application may operate more efficiently when a large amount of cache space is available, while another application may operate efficiently with any amount of cache space available. Thus, the threads which may benefit from a larger cache allocation may be apportioned a larger area of shared cache 300 by core controller 116, while the threads which may not benefit from a larger cache allocation may be apportioned a smaller area of shared cache 300 by core controller 116.

Figure 3:
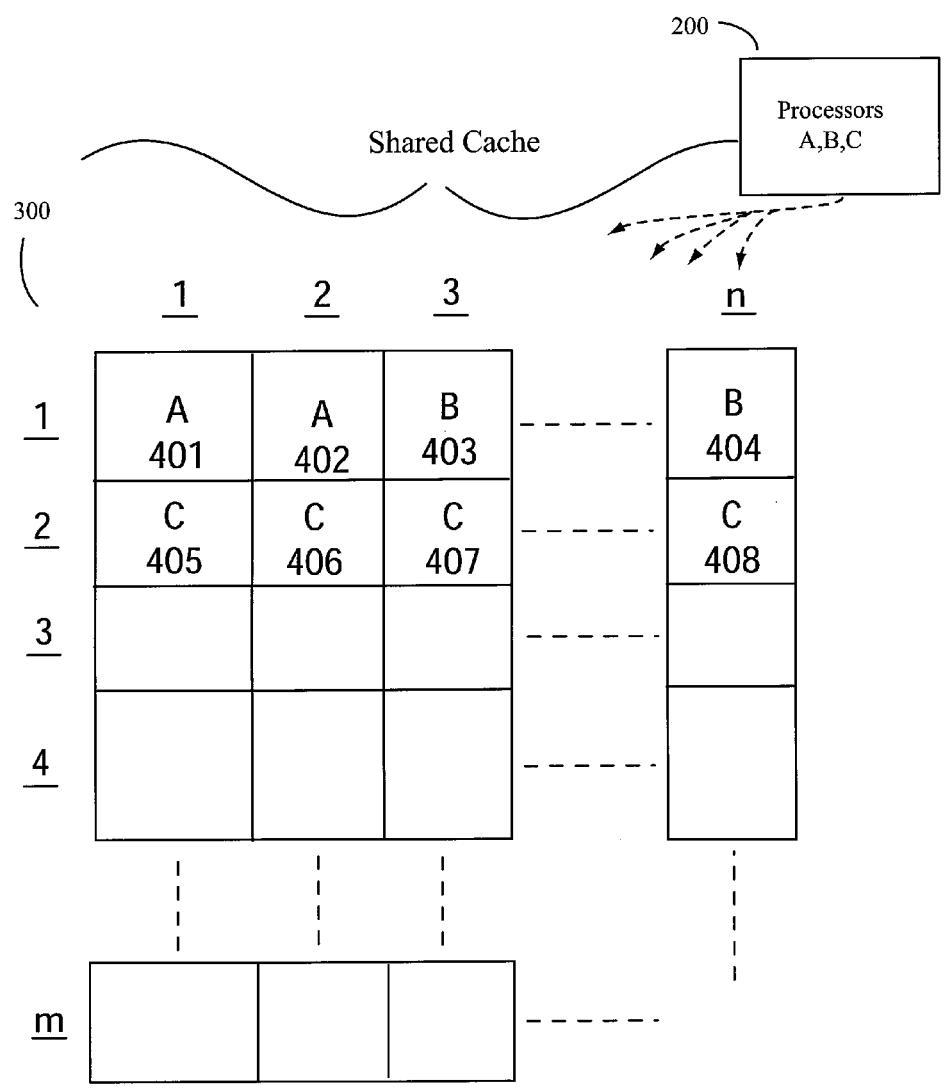
FIG. 3 is a schematic diagram illustrating the partitioning of a shared cache.

FIG. 3 is a schematic diagram illustrating the partitioning of a shared cache 300 in accordance with the present disclosure. The rows in FIG. 3 represent the 1 through m lines in shared cache 300. The columns in FIG. 3 represent the 1 through n ways into shared cache 300. Thus, block 401 in FIG. 3 represents way "1" into cache line "1" in shared cache 300. Similarly, block 408 represents way "n" into cache line "2" in shared cache 300. FIG. 3 depicts one possible partitioning of shared cache 300. Block 200 depicts a plurality of processor cores which may be associated with the shared cache 300. A first processor core "A" is depicted as having been allocated ways "1" and "2" into cache line "1". A second processor core "B" is depicted as having been allocated ways "3" through "n" into cache line "1". Thus, in the example shown, provided that n is larger than 2, processor core "B" has been allocated a larger portion of shared cache 300 than processor core "A". Furthermore, a processor core "C" is depicted as having been allocated all the ways "1" through "n" into cache line "2". Thus, processor core "C" has been allocated a larger portion of shared cache 300 that either processor cores "A" or "B". It is to be appreciated that processor cores 200 may be partitioned shared cache 300 space in any combination of cache lines and ways, and that some processor cores 200 may share any combination of lines and ways. The specific partitioning of shared cache 300 in FIG. 3 is not in any way intended to be limiting.

In further examples, cache partitioning may be accomplished by reference to the locality of a thread. For example, within an application program, some instructions may be looped (executed more than once), while other instructions may be non-looped (only executed a single time). Such non-looped instructions are referred to as strided references. Because strided references are non-looped, e.g., they do not repeat the same instructions more than once, strided references may not benefit from cache memory.

Figure 4:
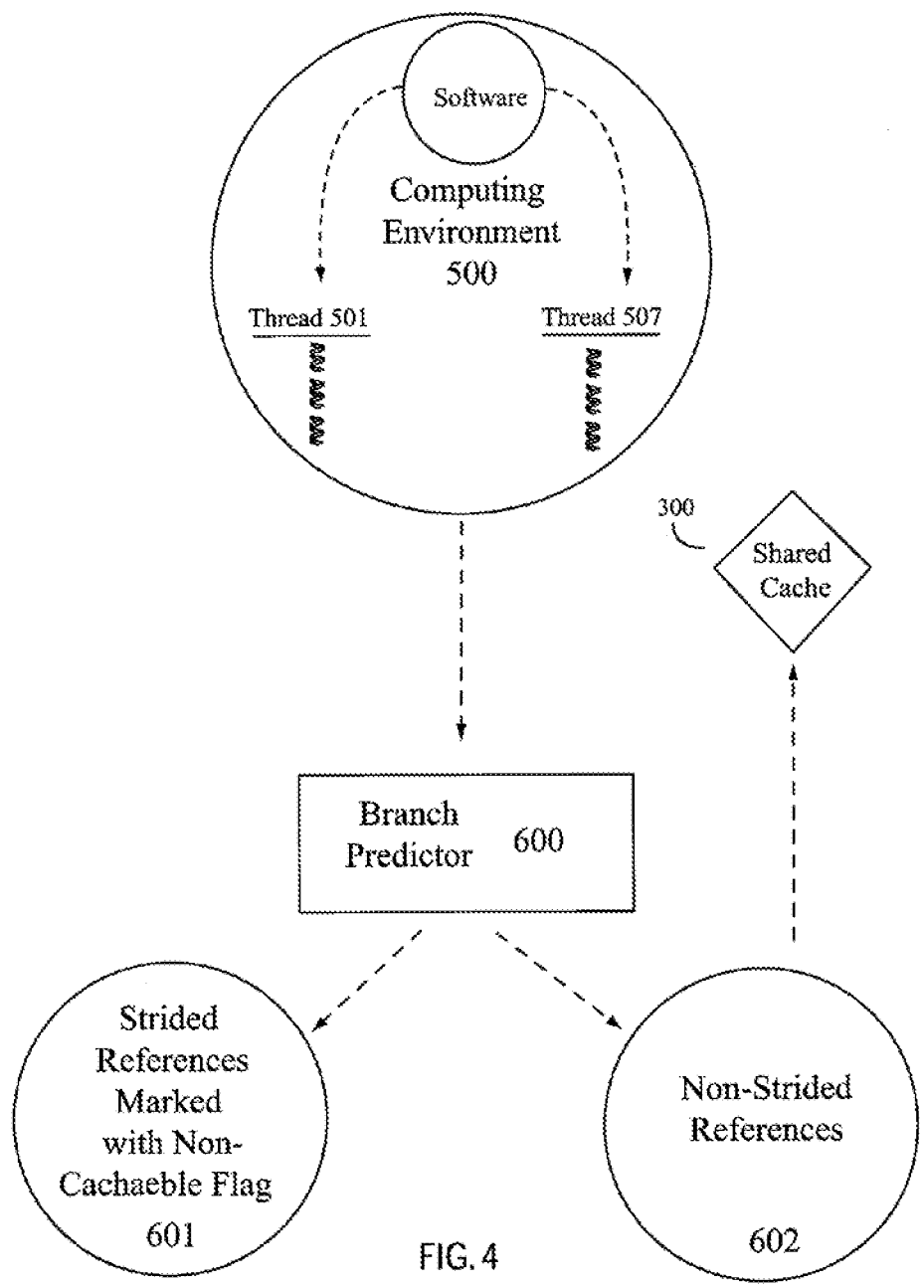
FIG. 4 is a block diagram illustrating a process for cache allocation.

FIG. 4 is a block diagram illustrating a process for cache allocation in accordance with the present disclosure. As depicted in FIG. 4, instructions from a computing environment 500, which may contain a plurality of threads of execution 501-502, may be sent to a branch predictor 600 for a determination of whether the instruction is looped (e.g., whether the branch predictor 600 has seen this instruction more than once), or non-looped. If the branch predictor 600 determines that an instruction is non-looped, thus a strided reference, the instruction may be marked with a non-cacheable flag such that the instruction is never sent to a cache [block 601]. Alternatively, if the branch predictor 600 determines that an instruction is looped [block 602], the instruction may then be sent to a shared cache 300. Thus, access to a shared cache may be limited to those instructions which may have greater benefit from the cache space.

It is to be appreciated that software application execution characteristics may change dynamically. Thus, in one or more of the examples disclosed herein, cache partitioning may be configured to change over time in a dynamic manner.

Figure 5A:
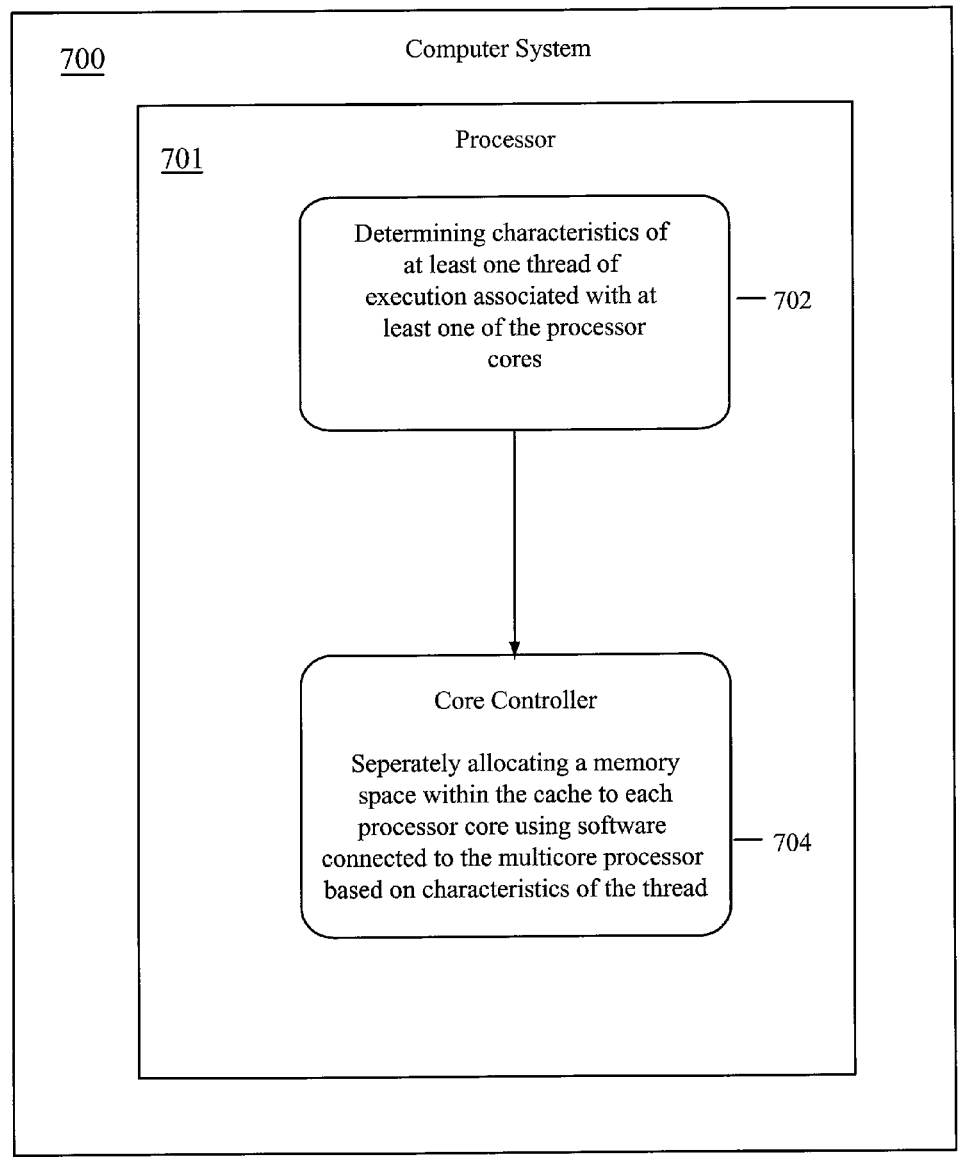
FIG. 5A is a block diagram illustrating a system and process for cache allocation, all arranged in accordance with at least some examples of the present disclosure.

FIG. 5A is a block diagram illustrating a system and process for cache allocation in accordance with at least some examples of the present disclosure. As shown in the FIG. 5A, a computer system 700 may include a processor 701 configured for performing an example of a process for partitioning a shared cache. In other examples, various operations or portions of various operations of the process may be performed outside of the processor 701. In operation 702, the process may include determining characteristics of at least one thread of execution associated with at least one of the processor cores. In operation 704, the process may include a core controller separately allocating a memory space within the cache to individual processor cores using software coupled to the multi-core processor, based at least in part on the characteristics of the thread.

Figure 5B:
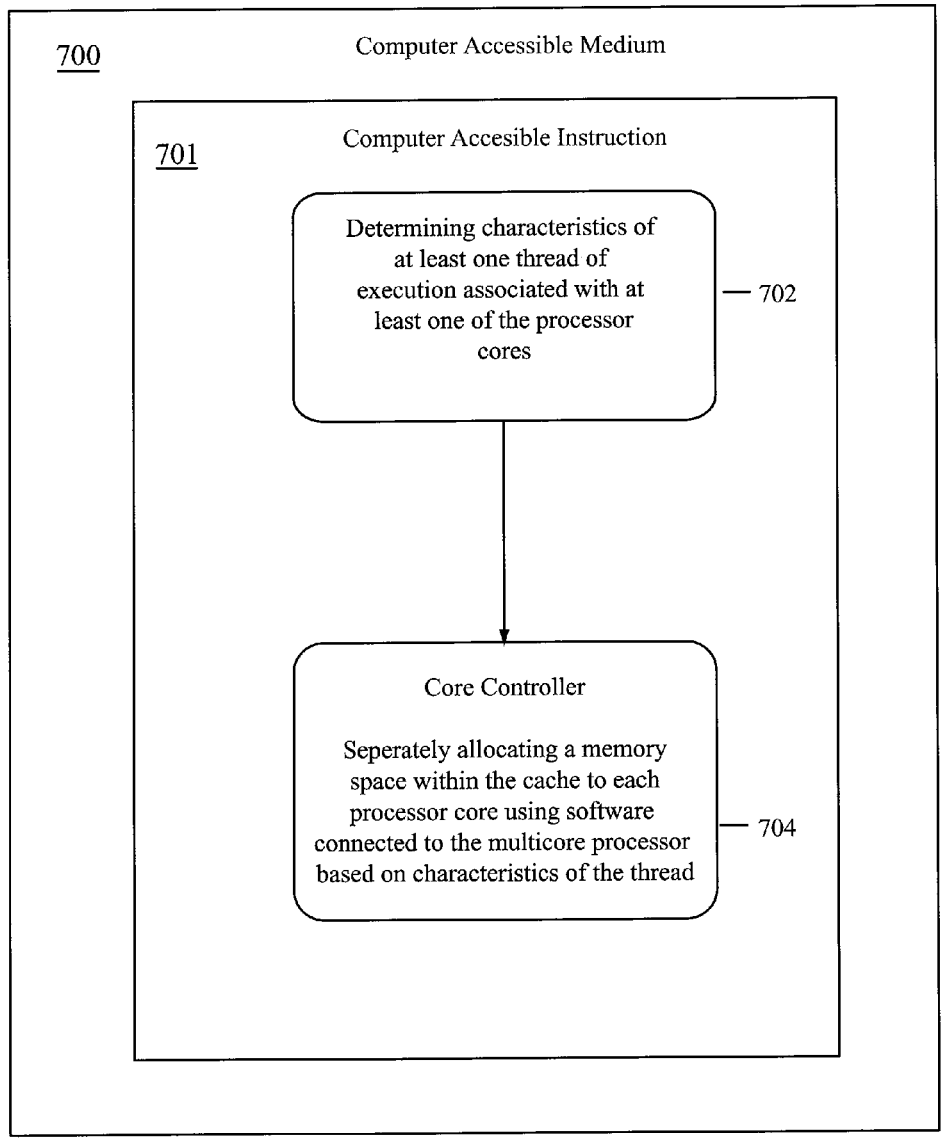
FIG. 5B is a block diagram illustrating a computer accessible medium for cache allocation, with computer accessible instructions stored thereon in accordance with at least some examples of the present disclosure.

FIG. 5B is a block diagram illustrating a system and process for cache allocation in accordance with at least some examples of the present disclosure. As shown in the FIG. 5B, a computer accessible medium 700 may include computer accessible instructions 701 stored thereon for performing an example procedure for allocating a shared cache space within a multi-core processor computing system. In operation 702, the procedure may include determining characteristics of at least one thread of execution associated with at least one of the processor cores. In operation 704, the procedure may include a core controller separately allocating a memory space within the cache to individual processor cores using software coupled to the multi-core processor, based at least in part on the characteristics of the thread.

The foregoing describes various examples of processor based cache allocation. Following are specific examples of methods and systems of processor based cache allocation. These are for illustration only and are not intended to be limiting.

Disclosed in a first example is a computing system comprising a multi-core processor, at least one cache that is accessible to at least two of the processor cores, and software coupled to the multi-core processor for separately allocating memory space within the cache to individual processor cores accessing the cache by a core controller. In some further examples, the memory space within the cache may be allocated to the processor cores based at least in part on hardware characteristics of the processor cores. In other examples, the memory space within the cache may be allocated to the processor cores based at least in part on the execution characteristics of one or more threads of execution associated with the processor cores. In some further examples, allocation of the memory space within the cache may be accomplished by restricting the number of ways the processor cores have access into the cache. In these examples, way restriction may also be determined at each cache line. In still other examples, the system includes one or more branch predictors configured for identifying strided references, and the software includes instructions for allocating memory space within the cache based at least in part on the identification. In these examples, the strided references may be marked with a non-cacheable flag such that they are not stored within the cache.

Disclosed in a second example is a process for allocating memory space within a shared cache in a multi-core processor computing system, the cache being accessible by at least two of a plurality of processor cores, the process comprising determining characteristics of at least one thread of execution associated with at least one of the processor cores and separately allocating a memory space within the cache to each processor core by a core controller using software coupled to the multi-core processor, based at least in part on the characteristics of the thread. In some further examples, the memory space within the cache may be allocated to the processor cores based at least in part on hardware characteristics of the processor cores. In some further examples, allocation of the memory space within the cache may be accomplished by restricting the number of ways the processor cores have access into the cache. In these examples, way restriction may also be determined at each cache line. In still other examples, the process includes using one or more branch predictors configured for identifying strided references, and further using software that includes instructions for allocating memory space within the cache based at least in part on the identification. In these examples, the strided references may be marked with a non-cacheable flag such that they are not stored within the cache.

Disclosed in a third example is a computer accessible medium having stored thereon computer executable instructions for performing a procedure for partitioning a shared cache space within a multi-core processor computing system, where the procedure includes separately allocating a memory space within the cache to each processor core by a core controller using software coupled to the multi-core processor based at least in part on at least one thread of execution. In some further examples, the memory space within the cache may be allocated to the processor cores based at least in part on hardware characteristics of the processor cores. In other examples, the memory space within the cache may be allocated to the processor cores based at least in part on the execution characteristics of one or more threads of execution associated with the processor cores.

The present disclosure is not to be limited in terms of the particular examples described in this application, which are intended as illustrations of various aspects. Many modifications and examples may be made without departing from its spirit and scope, as will be apparent to those skilled in the art. Functionally equivalent processes and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular processes, reagents, compounds compositions or biological systems, which can, of course, vary. It is also to be understood that the terminology used herein is for the purpose of describing particular examples only, and is not intended to be limiting.

The herein described subject matter sometimes illustrates different components contained within, or coupled with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computing system, comprising:
 a multi-core processor comprising individual processor cores;
 a cache that is accessible to the individual processor cores; and
 a core controller associated with the multi-core processor, the core controller configured to allocate a memory space within the cache to the individual processor cores that access the cache,
 wherein the controller is further configured to allocate respective distinct areas of the cache for exclusive use by one or more of the processor cores,
 wherein the core controller is further configured to allocate memory space within the cache to the individual processor cores for their respective exclusive use based at least in part on execution characteristics of one or more threads of execution associated with the individual processor cores, including execution characteristics that change over time, such that allocation of the memory space within the cache by the core controller, for the respective exclusive use of the individual processor cores, corresponding changes dynamically over time, and wherein threads that benefit from, including more efficient operation with, a larger allocation of the memory space within the cache are apportioned a relatively larger area within the cache by the core controller and threads that benefit less from the larger allocation of the memory space within the cache are apportioned a relatively smaller area within the cache by the core controller.

2. The computing system of claim 1, wherein the core controller is further configured to allocate memory space within the cache to the individual processor cores based at least in part on hardware characteristics of the individual processor cores.

3. The computing system of claim 1, wherein the core controller is further configured to allocate memory space within the cache to the individual processor cores based at least in part on additional execution characteristics of the one or more threads of execution associated with the individual processor cores.

4. The computing system of claim 1, wherein the core controller is further configured to allocate memory space within the cache via way restriction wherein ways the individual processor cores have access into the cache are restricted.

5. The computing system of claim 4, wherein way restriction is determined separately at individual cache lines.

6. The computing system of claim 1, further comprising one or more branch predictors configured to identify strided references and non-strided references, wherein the core controller is configured to allocate memory space within the cache based at least in part on the identification of the strided references and the non-strided references.

7. The computing system of claim 6, wherein the core controller is further configured to mark the strided references with a non-cacheable flag such that the strided references are not stored within the cache and such that the non-strided references are stored within the cache.

8. A method to allocate memory space within a shared cache for use with individual processor cores within a multi-core processor in a computing system, the method comprising:
determining a characteristic of a thread of execution associated with one of the individual processor cores; and
separately allocating a memory space within the cache to individual processor cores for their respective exclusive use based at least in part on the determined characteristic of the thread of execution.

9. The method of claim 8, wherein allocating comprises allocating the memory space based at least in part on a hardware characteristic of the individual processor cores.

10. The method of claim 8, wherein allocating a memory space comprises restricting ways the individual processor cores have access into the cache.

11. The method of claim 10, wherein allocating a memory space comprises restricting ways at each cache line.

12. The method of claim 8, further comprising identifying strided references by a branch predictor, and wherein allocating comprises allocating based at least in part on identification of the strided references.

13. The method of claim 12, further comprising marking strided references with a non-cacheable flag such that the strided references are not stored within the cache.

14. A non-transitory computer accessible medium having stored thereon computer executable instructions to perform a procedure to allocate memory space in a shared cache space for use with individual processor cores within a multi-core processor in a computing system, the computer executable instructions, in response to execution by a controller, cause the controller to:
determine a characteristic of a thread of execution associated with one of the individual processor cores;
allocate a respective distinct memory space within the shared cache to individual processor cores of the multi-core processor for their respective exclusive use based at least in part on the determined characteristic of the thread of execution; and
dynamically change an apportioned size of the allocated respective distinct memory space within the shared cache for the respective exclusive use of the individual processor cores based at least in part on a change of the determined characteristic of the thread of execution.

15. The computer accessible medium of claim 14, wherein the computer executable instructions further include computer executable instructions, that in response to execution by the controller, cause the controller to: allocate the respective distinct memory space within the shared cache based at least in part on hardware characteristics of the individual processor cores.

16. The computer accessible medium of claim 14, wherein to allocate the respective distinct memory space based at least in part on the determined characteristic of the thread of execution, the computer readable instructions include computer executable instructions, that in response to execution by the controller, cause the controller to allocate the respective distinct memory space within the shared cache based at least in part on an execution characteristic of the thread of execution associated with each individual processor core.

17. The computer accessible medium of claim 14, wherein the computer executable instructions further include computer executable instructions, that in response to execution by the controller, cause the controller to: restrict a number of ways the individual processor cores access their respective distinct memory space within the shared cache.

18. The computer accessible medium of claim 17, wherein to restrict the number of ways, the computer executable instructions include computer executable instructions, that in response to execution by the controller, cause the controller to use software to restrict the number of ways at each cache line.

19. The computer accessible medium of claim 14, wherein to determine the characteristic of the thread of execution, the computer executable instructions include computer executable instructions, that in response to execution by the controller, cause the controller to identify strided references by a branch predictor; and
wherein to allocate the respective distinct memory space, the computer executable instructions include computer executable instructions, that in response to execution by the controller, cause the controller to allocate the respective distinct memory space within the shared cache based at least in part on identification of the strided references.

20. The computer accessible medium of claim 19, wherein the computer executable instructions further include computer executable instructions, that in response to execution by the controller, cause the controller to mark the strided references with a non-cacheable flag such that the strided references are not stored within the shared cache.

* * * * *

UNITED STATES PATENT AND TRADEMARK OFFICE
CERTIFICATE OF CORRECTION

| | | |
|---|---|---|
| PATENT NO. | : 9,208,093 B2 | Page 1 of 1 |
| APPLICATION NO. | : 12/427598 | |
| DATED | : December 8, 2015 | |
| INVENTOR(S) | : Conte et al. | |

It is certified that error appears in the above-identified patent and that said Letters Patent is hereby corrected as shown below:

In the claims,

In Column 9, Line 5, in Claim 1, delete "lass" and insert -- less --, therefor.

Signed and Sealed this
Fifth Day of April, 2016

Michelle K. Lee
*Director of the United States Patent and Trademark Office*